C. P. HEIL.
EGG TESTING DEVICE.
APPLICATION FILED NOV. 26, 1915.
1,192,305.
Patented July 25, 1916.
2 SHEETS—SHEET 1.
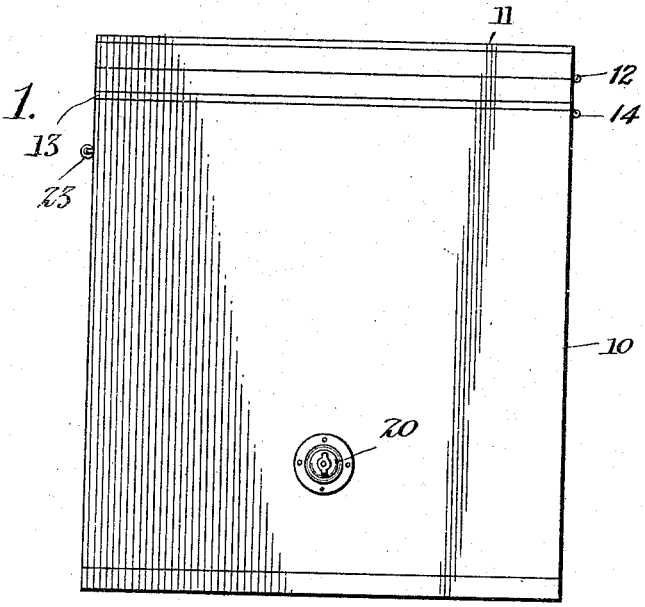
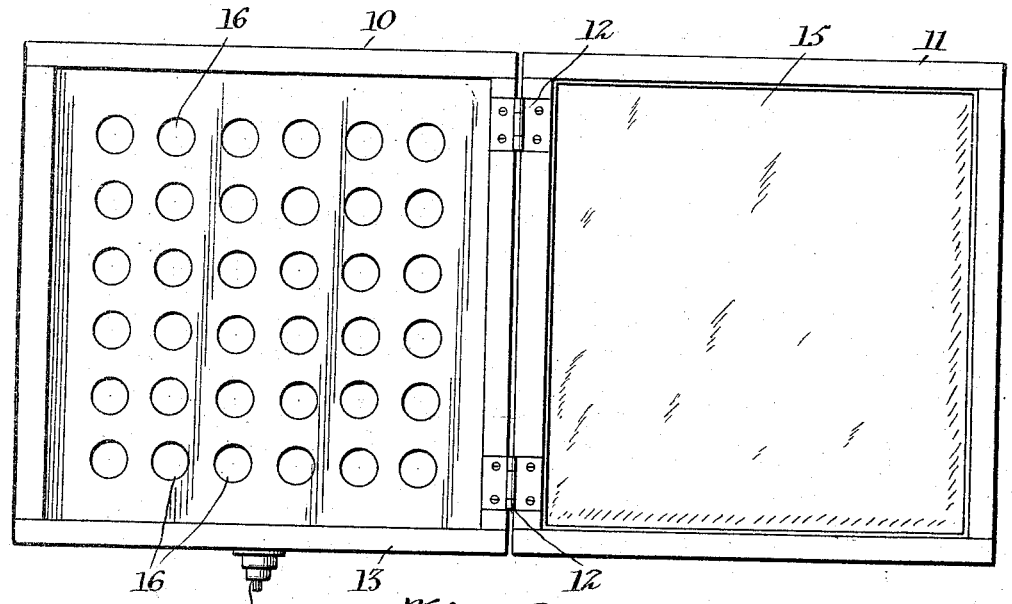
Inventor
C. P. Heil.
Witnesses
By Victor J. Evans
Attorney

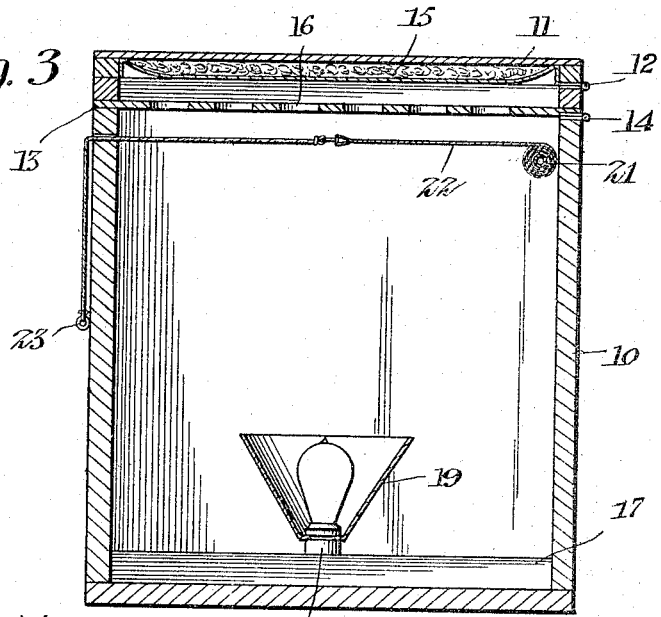
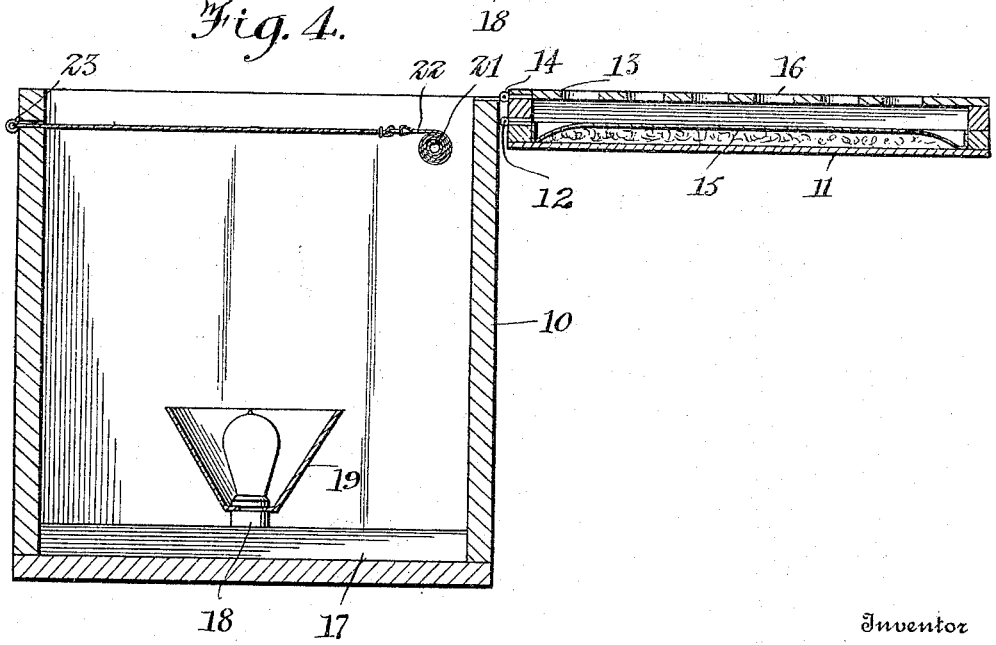

UNITED STATES PATENT OFFICE.

CHRISTIAN P. HEIL, OF AVON, SOUTH DAKOTA.

EGG-TESTING DEVICE.

1,192,305.  Specification of Letters Patent.  Patented July 25, 1916.

Application filed November 26, 1915. Serial No. 63,532.

*To all whom it may concern:*

Be it known that I, CHRISTIAN P. HEIL, a citizen of the United States, residing at Avon, in the county of Bonhomme and State of South Dakota, have invented new and useful Improvements in Egg-Testing Devices, of which the following is a specification.

The invention relates to egg testing devices.

The primary object of the invention is the provision of an egg tester of the character wherein any number of eggs can be candled so as to determine the freshness thereof without necessitating the handling of each and all of the eggs for this particular purpose, and in this manner saving considerable time and enabling the testing of the said eggs with dispatch.

Another object of the invention is the provision of an egg tester of this character wherein the construction thereof assures the quick and easy handling of the eggs to and from the crate and tester.

A further object of the invention is the provision of a tester of this character wherein a testing light can be shielded from any given number of rows of holes in the supporting tray for holding the eggs, thereby directing the light solely to the holes occupied by eggs and thus enabling the candling of a small or large number of eggs, as occasion may require.

A still further object of the invention is the provision of a device of this character which is extremely simple in construction, thoroughly reliable and efficient in operation, strong, durable and inexpensive in manufacture.

With these and other objects in view, the invention consists in the features of construction and the combination and arrangement of parts hereinafter described, pointed out in the claims and illustrated in the accompanying drawings, wherein—

Figure 1 is a side elevation of a tester constructed in accordance with the invention; Fig. 2 is a top plan view with the cover or lid open; Fig. 3 is a vertical longitudinal sectional elevation; and Fig. 4 is a view similar to Fig. 3, with the egg tray open.

Similar reference characters indicate corresponding parts throughout the several views of the drawings.

Referring to the drawings in detail, the egg tester comprising a body 10 which is preferably made in the form of a rectangular box-like structure inclosed on all sides except the top, which is adapted to be closed by means of a cover or lid 11, the latter being swingingly connected at one edge through the medium of hinges 12 to an egg supporting tray 13, the same being swingingly connected to one edge of the top through the medium of hinges 14 so that it may be raised and lowered, as occasion may require. It will be apparent that by reason of the disposition of the hinges 12 and 14, respectively, both the cover or lid 11 and tray 13 open and close in the same direction with respect to each other.

Suitably secured to the inner face of the lid or cover 11 is a padded lining 15 which protects eggs when supported in the tray 13 for the candling of said eggs, the tray 13 being formed with openings 16 for receiving eggs to be candled.

Located within the body 10 at the bottom thereof, centrally of the same, is a transverse rail 17 on which is mounted centrally of the same a suitable electric light fixture including an electric bulb socket 18 and a reflector 19, which is disposed concentrically thereof and is adapted to throw the light from the bulb toward the open top of the body, the socket 18 being arranged in an electric circuit having a cut off switch 20 which is mounted exteriorly on one side wall of the body and is adapted to turn on and off the electric current for the lighting and extinguishing of the electric bulb.

Mounted in the open top of the body 10 on the side next to the hinges 14 connecting the tray 13 thereto is a curtain shade roller 21 which can be of any desired construction and is adapted to support a curtain 22 which can be readily wound thereon and unwound from the same so as to be extended or retracted for any required distance across the open top of the body 10, thereby shutting off or admitting the light from the electric bulb engaged in the socket 18 to any number of eggs supported within the tray 13 for the candling of the same. The curtain 22 has mounted thereon a finger tab 23 which permits the convenient manipulation thereof.

When eggs are placed within the tray 13 and the cover or lid is lowered on to the latter the upper ends of the eggs will contact with the lining of the said lid or cover 11, thereby holding the same in the openings in the tray without damage thereto. When the eggs are to be candled the cover or lid 11 is raised and the switch 20 is turned on for illuminating the electric bulb so that the rays of light therefrom are thrown upwardly by the reflector 19 and in this manner the eggs are rendered transparent so that inspection thereof can be had for the testing of the same.

When the eggs are held within the tray and the cover is closed on to the same both can be swung to open position so that the eggs within the tray will be transferred therefrom on to the cover which permits the easy and convenient handling of the same with despatch for the placing of the eggs within a crate.

From the foregoing description, taken in connection with the accompanying drawings, it is thought that the construction and mode of use of the device will be readily apparent without further detailed description.

Having thus described my invention, I claim:

An egg tester comprising a box-like body, a reticulated egg supporting tray swingingly connected to the body at the top thereof, a cover swingingly connected to the tray at the side of its connection with the body and having a padded lining, an electric fixture arranged within the body and including a reflector and electric light socket, an electric circuit including the socket, a cut-off switch arranged in the circuit, and a roller shade mounted in the top of the body and adapted to be extended and retracted for any distance across the open top of the body.

In testimony whereof I affix my signature in presence of two witnesses.

CHRISTIAN P. HEIL.

Witnesses:
E. J. KIEHLBAUCH,
WM. KIEHLBAUCH.

Copies of this patent may be obtained for five cents each, by addressing the "Commissioner of Patents, Washington, D. C."